United States Patent
Kämpf

(10) Patent No.: US 6,799,666 B2
(45) Date of Patent: Oct. 5, 2004

(54) TORQUE LIMITING COUPLING

(75) Inventor: Klaus Kämpf, Lohmar (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/342,056

(22) Filed: Jan. 14, 2003

(65) Prior Publication Data

US 2003/0136625 A1 Jul. 24, 2003

(30) Foreign Application Priority Data

Jan. 21, 2002 (DE) .......................................... 102 01 988

(51) Int. Cl.$^7$ .......................................... F16D 43/206
(52) U.S. Cl. .......................... 192/56.54; 192/24; 192/83
(58) Field of Search .............. 192/24, 56.54, 192/83, 114 R; 464/36, 38

(56) References Cited

U.S. PATENT DOCUMENTS

| | | | | |
|---|---|---|---|---|
| 3,203,523 A | | 8/1965 | Gilder et al. | |
| 3,405,790 A | * | 10/1968 | Orwin et al. | 192/56.54 |
| 4,294,340 A | * | 10/1981 | Kunze | 192/56.54 |
| 4,460,077 A | * | 7/1984 | Geisthoff | 192/24 |
| 4,538,715 A | * | 9/1985 | Konrad et al. | 192/56.57 |
| 5,092,441 A | * | 3/1992 | Fujii | 192/56.54 |
| 5,868,231 A | * | 2/1999 | Kampf | 192/56.5 |

FOREIGN PATENT DOCUMENTS

| | | |
|---|---|---|
| DE | 30 34 606 A1 | 3/1982 |
| DE | 28 53 293 C2 | 12/1983 |
| EP | 1 293 693 A2 | 3/2003 |
| EP | 1 293 696 A1 | 3/2003 |

* cited by examiner

Primary Examiner—Richard M. Lorence
(74) Attorney, Agent, or Firm—Harness, Dickey & Pierce, P.L.C.

(57) ABSTRACT

A torque limiting coupling has a coupling hub (2) with circumferentially distributed apertures (5). Driving members (6) are adjustably held in the apertures (5). A coupling sleeve (3) includes first recesses (7). A switching disk (4) is rotatably arranged between a coupling position and an uncoupling position. The switching disk (4) is loaded towards the coupling position and loads the driving members (6) towards the coupling hub (2). The driving members (6), for torque transmitting purposes, engage the first recesses (7). When a torque limit is exceeded, the driving members (6) are transferred into the uncoupling position. Here, second recesses (8) are engaged by the driving members (6) in the uncoupling position. A locking means (28) is adjustable between a locking position, where the switching disk (4) is locked in its uncoupling position, and a disengaging position. A retainer (25) is adjustable between a retaining position, where the locking means (28) is secured in its disengaging position, and a releasing position. A detent pawl (19) is movable between a neutral position and a disconnecting position. In the disconnecting position, the detent pawl (19) transfers the switching disk 4 into the uncoupling position. In the disconnecting position, the detent pawl (19) transfers the retainer into the retaining position.

7 Claims, 4 Drawing Sheets

TORQUE LIMITING COUPLING

CROSS-REFERENCE TO RELATED APPLICATIONS

This application claims priority to German Patent Application No. 102 01 988.6 filed Jan. 21, 2002, which application is herein expressly incorporated by reference.

FIELD OF THE INVENTION

The invention relates to a torque limiting coupling in a driveline of an agricultural implement. The torque limiting coupling prevents agricultural implements from being damaged or destroyed by overloading. The torque limiting coupling separates the drive from the agricultural implement in cases where the torque required to drive the agricultural implement exceeds a limit value and where the risk of damage to the implement is present. This can occur, for instance, if the agricultural implement stalls.

BACKGROUND OF THE INVENTION

DE 30 34 606 A1 illustrates a torque limiting coupling with a coupling hub and a coupling sleeve which is rotatably arranged around a longitudinal axis. The coupling hub includes apertures which adjustably hold driving members that extend parallel to the longitudinal axis. The driving members, in a torque transmitting position, engage recesses which correspond to the apertures. A switching disk is axially loaded by a spring and supported against the driving members so that the driving members are held in the recesses. The switching disk is rotatable between a torque transmitting position and a freewheeling position. The switching disk is spring-loaded in the circumferential direction towards the torque transmitting position.

When a predetermined torque is exceeded, the driving members are axially pressed against the spring force of the spring out of the recesses. The driving members roll on a side face of the coupling sleeve and thus rotate the switching disk into its freewheeling position where the driving members engage recesses in the switching disk. In this position, the coupling hub, with respect to drive, is disconnected from the coupling sleeve. Thus, torque cannot be transmitted between the coupling hub and the coupling sleeve. Furthermore, the circumference of the switching disk includes a radially outwardly pointing switching cam. A switching tappet is adjustably arranged between a releasing position and a locking position. In the locking position, the switching tappet cooperates with the switching cam so that, when the torque limiting coupling rotates, the switching disk is transferred into its freewheeling position. Thus, this interrupts the transmission of torque. A returning cam on the coupling lug moves the switching tappet back into the releasing position after the switching disk has been rotated. A disadvantage of this embodiment is that, after the torque limiting coupling has been disconnected, the latter is automatically re-connected at low speeds since the switching disk is spring-loaded towards its torque transmitting position. In consequence, the torque limiting coupling is automatically re-connected in any event.

DE 28 53 293 C2 discloses a torque limiting coupling which operates on the same principle as the torque limiting coupling according to DE 30 34 606 A1. However, there is no switching tappet that cooperates with a switching cam on the switching disk to disconnect the torque limiting coupling. A spring-loaded locking ball is in a radially extending bore of the switching disk. The spring-loaded locking ball, in the freewheeling position of the switching disk, engages behind a stop and thus holds the switching disk in the freewheeling position. After the torque limiting coupling has been disconnected as a result of an overload, it is not re-connected automatically after a predetermined low speed has been reached. The torque limiting coupling has to be manually connected.

SUMMARY OF THE INVENTION

It is an object of the present invention to provide a torque limiting coupling that interrupts torque transmission when an overload occurs. The torque limiting coupling enables automatic re-connection when lower speeds are reached. Also, the torque limiting coupling enables emergency disconnection of the torque limiting coupling and prevents automatic re-connection.

In accordance with the invention, the torque limiting coupling, in particular in a driveline for driving agricultural implements, defines a longitudinal axis around which the torque limiting coupling is rotatably arranged. A coupling hub has circumferentially distributed apertures. Driving members are held parallel relative to the longitudinal axis so as to be adjustable in the apertures of the coupling hub. A coupling sleeve drives the coupling hub. The coupling sleeve has first recesses that correspond to the apertures. A switching disk is rotatably arranged, relative to the coupling hub, between a coupling position and an uncoupling position. The switching disk is loaded towards the coupling position by a circumferentially acting spring. An axially acting spring loads the switching disk towards the coupling hub. The switching disk is axially supported against the driving members. The driving members, for torque transmitting purposes, engage the first recesses of the coupling sleeve. If a predetermined torque limit is exceeded, the switching disk can be transferred from the coupling position into the uncoupling position by a rolling movement of the driving members. The switching disk has second recesses that correspond to the apertures. The second recesses are engaged by the driving members in the uncoupling position. A locking mechanism is adjustable between a locking position, where the switching disk, in its uncoupling position, is locked to prevent it from being rotated into the coupling position, and a disengaging position. A retainer is adjustable between a retaining position, where the locking mechanism is secured in its disengaging position against displaced into the locking position, and a releasing position. A detent pawl is displaceable between a neutral position and a disconnecting position. The detent pawl, in the disconnecting position, cooperates with a radially extending switching face of the switching disk. The detent pawl transfers the switching face from the coupling position into the uncoupling position. The detent pawl, in the disconnecting position, cooperates with a radially extending switching face of the retainer. The detent pawl transfers the retainer switching face from the releasing position into the retaining position.

The locking mechanism is not transferred into its locking position until the torque limiting coupling is disconnected by the detent pawl. If disconnection results from an overload, the locking mechanism remain in its disengaging position. Thus, this ensures that the torque limiting coupling is not automatically re-connected after the torque limiting coupling had been disconnected by the detent pawl. Automatic re-connection is possible only if disconnection results from an overload if a certain speed is not reached. For example, the detent pawl can be actuated in those cases where an emergency off-switch is actuated. In such a case, the driven masses can be braked and stopped by a separate braking device without the torque limiting coupling being automatically re-connected when the speed falls below a certain speed.

According to a first embodiment, the locking mechanism has at least one locking member which is adjustable in parallel to the longitudinal axis. The locking member, in the locking position, holds the switching disk and the coupling hub in a rotationally fast way relative to each other. The locking member may be a spring-loaded pin adjustably guided in a bore of the coupling hub. The bore extends parallel to the longitudinal axis. The pin, in the locking position, enters a bore in the switching disk.

The retainer may be a retaining disk. The retainer disk is rotatably adjustable around the longitudinal axis relative to the switching disk. The retainer disk has an aperture that is aligned with the bore of the switching disk in the releasing position. The aperture enables passage of the pin. The retainer disk, in the retaining position, covers the bore of the switching disk and prevents the pin from entering the bore.

According to a second embodiment, the locking mechanism has at least one locking member which is radially adjustable relative to the longitudinal axis. The locking mechanism, in the locking position, holds the switching disk and the coupling hub in a rotationally fast way relative to one another. The locking member may be a spring-loaded roller. The spring-loaded roller is adjustably guided in a first radial recess in an outer circumferential face of the coupling hub. In the locking position, the spring loaded roller enters a second radial recess in an inner circumferential face of the switching disk.

The retainer is preferably an annular retaining disk. The annular retaining disk is rotatably adjustable relative to the switching disk, around the longitudinal axis. The annular retaining disk has a third radial recess which starts from an inner circumferential face. In the releasing position, the third radial recess and second radial recess are aligned with one another. Thus, the roller may enter both the second radial recess and the third radial recess. In the retaining position, the second radial recess and the third radial recess are arranged so as to be offset relative to one another. Thus, the roller is prevented from entering the second radial recess.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
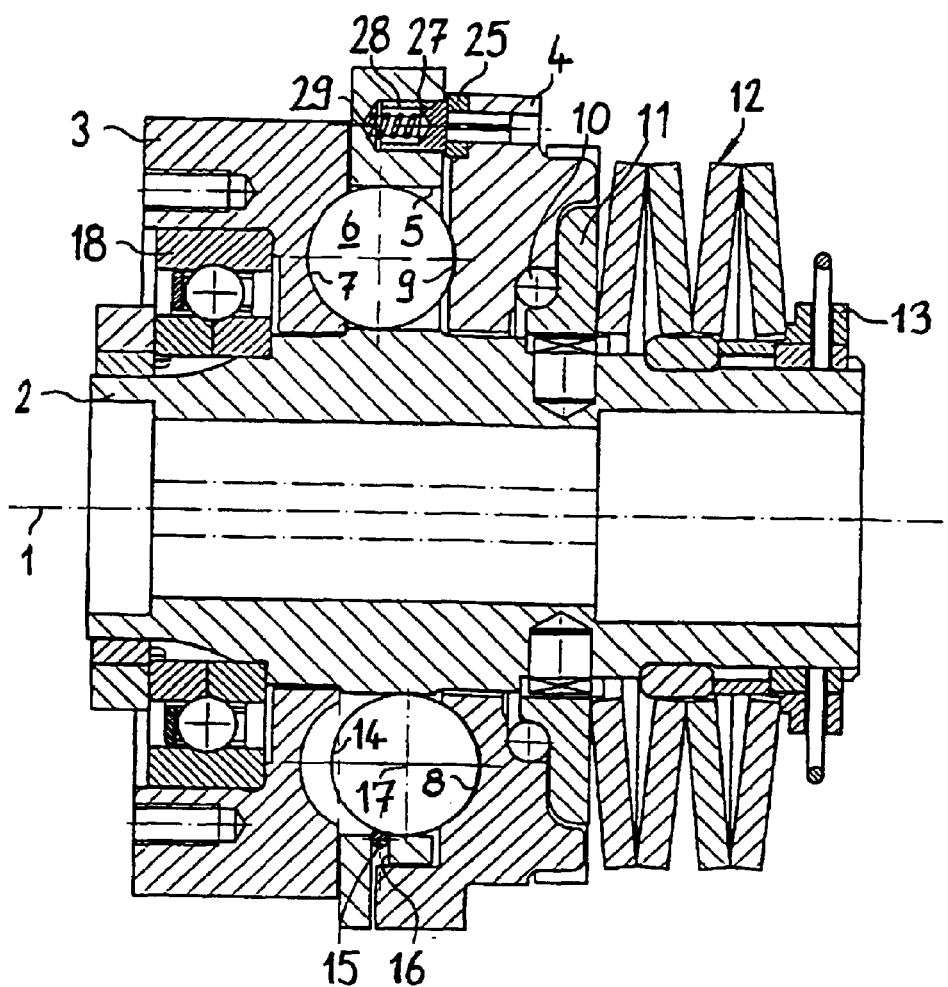
FIG. 1 is a longitudinal section view through a first embodiment of a torque limiting coupling.
Figure 2:
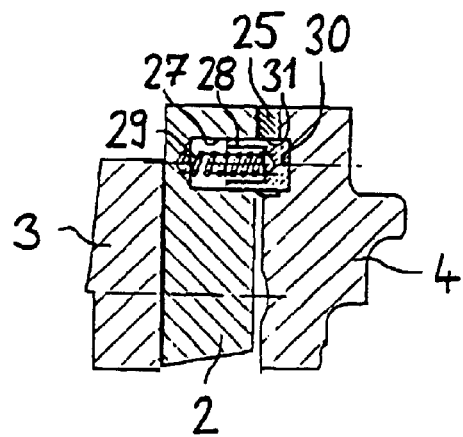
FIG. 2 is an enlarged section view cut-out of the locking mechanism and the retainer with the locking mechanism in its locking position.
Figure 3:
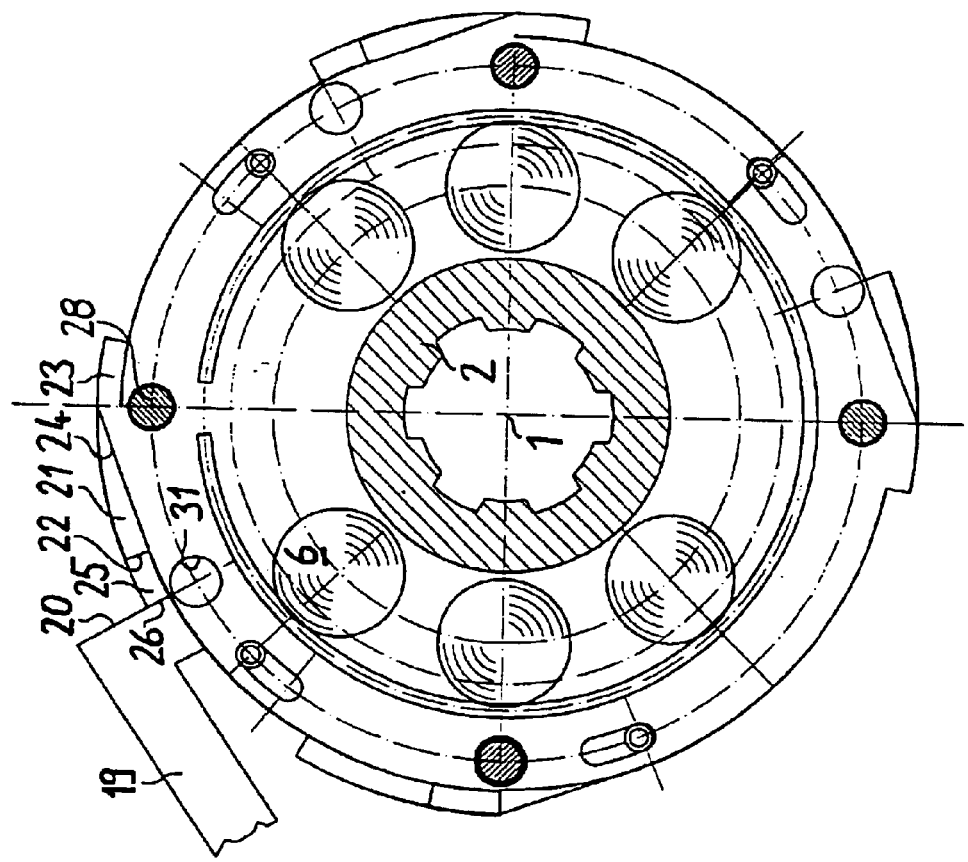
FIG. 3 is a diagrammatic cross-section view of the torque limiting coupling according to FIG. 1 with the switching disk in its coupling position.
Figure 4:
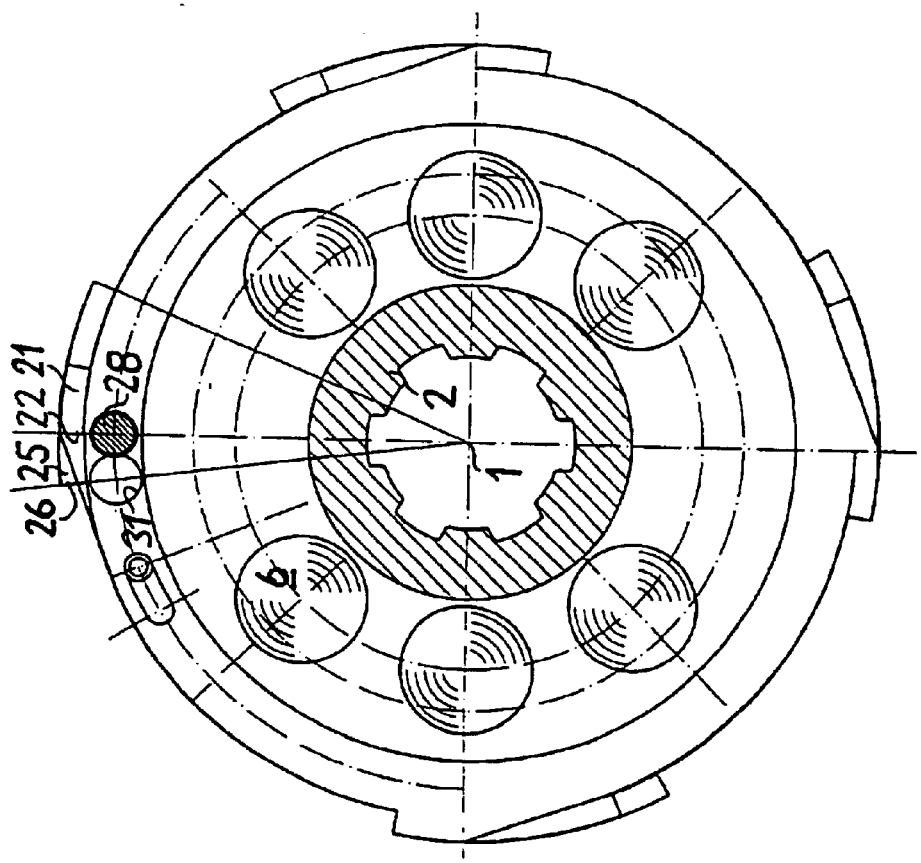
FIG. 4 is a diagrammatic cross-section view of torque limiting coupling according to FIG. 1 with the switching disk in its uncoupling position.

FIG. 1 illustrates a first embodiment of a torque limiting coupling in a longitudinal section. The torque limiting coupling is rotatably arranged around a longitudinal axis 1. The torque limiting coupling includes a coupling hub 2, a coupling sleeve 3 and a switching disk 4. The coupling hub 2 has circumferentially distributed apertures 5. Driving member 6, which act as rolling members, are held in the apertures 5 and are adjustable parallel to the longitudinal axis 1. The coupling sleeve 3 has first recesses 7 which correspond to the apertures 5. The switching disk 4 has second recesses 8 which correspond to the apertures 5. The switching disk 4 is rotatable relative to the coupling hub 2 around the longitudinal axis 1 between a coupling position and an uncoupling position.

In FIG. 1, the switching disk 4 is shown above the longitudinal axis 1 in its coupling position and underneath the longitudinal axis 1 in its uncoupling position. In the coupling position of the switching disk 4, the driving members 6 project from the apertures 5 towards the coupling sleeve 3 and engage the first recesses 7. On the side facing away from the coupling sleeve 3, the driving members 6 also project from the apertures 5 and are axially supported against running grooves 9. The running grooves are arranged between the second recesses 8 of the switching disk 4. The first recesses 7 of the coupling sleeve 3 and the second recesses 8 of the switching disk 4 are offset relative to one another with respect to their rotational position. Via a pressure bearing 10, the switching disk 4 is axially supported against a pressure ring 11. The pressure ring 11 is force-loaded by a package 12 of Belleville springs towards the switching disk 4. The package of Belleville springs 12 is supported against a supporting ring 13 which is firmly connected to the coupling hub 2. The driving members 6 are thus held in the first recesses 7.

When a torque limit is exceeded, the driving members 6 are pressed out of the first recesses 7 against the spring force of the package of Belleville springs 12. The package of Belleville springs 12 is compressed by an axial movement of the switching disk 4 towards the package of Belleville springs 12. The driving members 6 roll in the first running grooves 9 of the switching disk 4 and in the second running grooves 14 of the coupling sleeve 3. As a result of the rolling movement of the driving members 6, the switching disk 4 is rotated relative to the coupling hub 2 around the longitudinal axis 1. In the uncoupling position of the switching disk 4, the driving members 6 engage the second recesses 8. In the process, the switching disk 4 is axially moved by the spring force of the package of Belleville springs 12 towards the coupling sleeve 3. In this switched position, the transmission of torque between the coupling sleeve 3 and the coupling hub 2 is interrupted. Thus, the coupling sleeve 3 rotates relative to the coupling hub 2, with the driving members 6 rolling in the second running grooves 14.

Spring-loaded holding elements 15 are provided in the form of balls per driving member 6 to ensure that the driving members 6 are held in the second recesses 8 even in those cases where, as a result of the coupling hub 2 rotating relative to the coupling sleeve 3, the first recesses 7 and the second recesses 8 are in the same rotational position relative to one another. The balls are adjustably guided in radial bores 16 of the coupling hub 2. The radial bores 16 each end in one of the apertures 5. In the uncoupling position of the switching disk 4, where the driving members 6 engage the second recesses 8, the driving members 6 and the holding elements 15 are axially arranged relative to one another so that the radial distance between the coupling sleeve 3 and the holding elements 15 is smaller than the distance between the coupling sleeve 3 and the centres 17 of the driving members 6. The holding elements 15 are supported against the driving members 6 so that the driving members 6 are held axially in the second recesses 8.

Since the driving members 6 in the uncoupling position of the switching disk 4 do not engage the first recesses 7 of the coupling sleeve 3, the coupling sleeve 3 rotates relative to the coupling hub 2. A rolling bearing 18 is provided between the coupling sleeve 3 and the coupling hub 2 to enhance rotation. When the relative speed between the coupling sleeve 3 and the coupling hub 2 is reduced, the switching disk 4 is returned by a circumferentially acting spring (not shown) into the coupling position. Thus, the driving members 6 again engage the first recesses 7, which in turn, enables torque transmission between the coupling hub 2 and the coupling sleeve 3.

The torque limiting coupling can also be externally disconnected. To explain the function in greater detail, FIGS. 1 to 4 will be described jointly below, with identical components having the same reference numbers.

A detent pawl 19 is provided for external disconnection purposes. The detent pawl 19 is pivotable around a pivot axis, extending parallel to the longitudinal axis 1, between a neutral position and a disconnecting position. The detent pawl 19 is fixed in position relative to the torque limiting coupling. From its neutral position, the detent pawl 19 is transferred radially towards the torque limiting coupling into the disconnecting position. In the disconnecting position, a stop face 20 of the detent pawl 19 can be used to transfer the switching disk 4 from its coupling position into its uncoupling position. In the disconnecting position of the locking pawl 19, the stop face 20, upon rotation of the torque limiting coupling, abuts a switching face 22. The switching face 22 is formed by a switching cam 21 of the switching disk 4. The switching cam 21 is provided on the circumference of the switching disk 4. The switching disk 4 is thus held in position relative to the coupling hub 2 and transferred from its coupling position into its uncoupling position. A cam 23 is provided on the circumference of the coupling hub 2. The cam 23 forms a stop face 24. The detent pawl 19 slides on the cam 23 when the torque limiting coupling continues to rotate. The detent pawl 19 is pushed radially outwardly into the neutral position. This means that, after the disconnecting operation, the torque limiting coupling can continue to rotate. A separate braking unit can be provided for braking the rotating masses in a controlled way.

A retaining disk 25 is provided to prevent the torque limiting coupling from being re-connected automatically when the speed falls below a certain speed limit. The retaining disk 25, relative to the switching disk 4, is rotatably arranged between a retaining position and a freewheeling position. Furthermore, the retaining disk 25 is arranged between the coupling hub 2 and the switching disk 4 and is circular in shape. To be able to assume its releasing position, the retaining disk 25 is circumferentially loaded by a spring. The retaining disk 25 forms a radially extending switching face 26. After the detent pawl 19 has been transferred into its disconnecting position, it first abuts, by means of its stop face 20, against the switching face 26 of the retaining disk 25 and holds the retaining disk 25 in position relative to the switching disk 4. The detent pawl 19 then transfers the retaining disk 25 from its releasing position into its retaining position. In the retaining position, the switching face 26 of the retaining disk 25 is in alignment with the switching face 22 of the switching disk 4. As the torque limiting coupling continues to rotate, the switching disk 4, as has already been explained, is held in position relative to the coupling hub 2 and is transferred into its uncoupling position.

In a bore 27, extending parallel relative to the longitudinal axis 1 in the coupling hub 2, a pin 28 is spring-loaded and supported by a spring 29 towards the retaining disk 25. The switching disk 4 is also provided with a bore 30 which extends parallel relative to the longitudinal axis 1.

In the retaining position of the retaining disk 25, the retaining disk 25 covers the bore 30 of the switching disk 4 towards the coupling hub 2. In the releasing position of the retaining disk 25, an aperture 31 of the locking disk 25 is aligned relative to the bore 30 of the switching disk 4. As soon as the retaining disk 25 has been transferred into its releasing position and the switching disk 4 into its uncoupling position, the pin 28 moves through the aperture 31 of the switching disk 4 and engages the bore 30 of the switching disk 4.

Thus, the switching disk 4 is held in a rotationally fast way relative to the coupling hub 2 in its uncoupling position. Thus, it is not possible for the torque limiting coupling to be re-connected automatically when the speed falls below a certain speed limit. To achieve this, the pin 28 first has to be moved manually from the bore 30 of the switching disk 4 and from the aperture 31 of the retaining disk 25. In an emergency, the torque limiting coupling can be disconnected by the detent pawl 19, and at the same time it is ensured that the torque limiting coupling can only be deliberately reconnected.

As, for the purpose of assuming its releasing position, the retaining disk 25 is loaded by a spring. The retaining disk 25 is automatically moved into the retaining position after the pin 28 has been moved manually into the bore 27 of the coupling hub 2.

FIGS. 5 to 8 illustrate a second embodiment of an inventive torque limiting coupling and will be described jointly. Any components corresponding to components of the torque limiting coupling according to FIGS. 1 to 4 have been given reference number increased by the value 100 and were described in connection with FIGS. 1 to 4.

The difference between the torque limiting coupling according to FIGS. 1 through 4 and the second embodiment is that the coupling hub 102 is provided with a radially extending bore 32 which contains a spring 33. The spring 33 radially outwardly loads a locking member 34. The locking mechanism 34 is in the form of a roller which is guided in a first radial recess 35 of the coupling hub 102. The switching disk 104 has an inner circumferential face 36 provided with a second radial recess 37. Furthermore, the retaining disk 125 includes a third inwardly directed radial recess 38.

Figure 5:
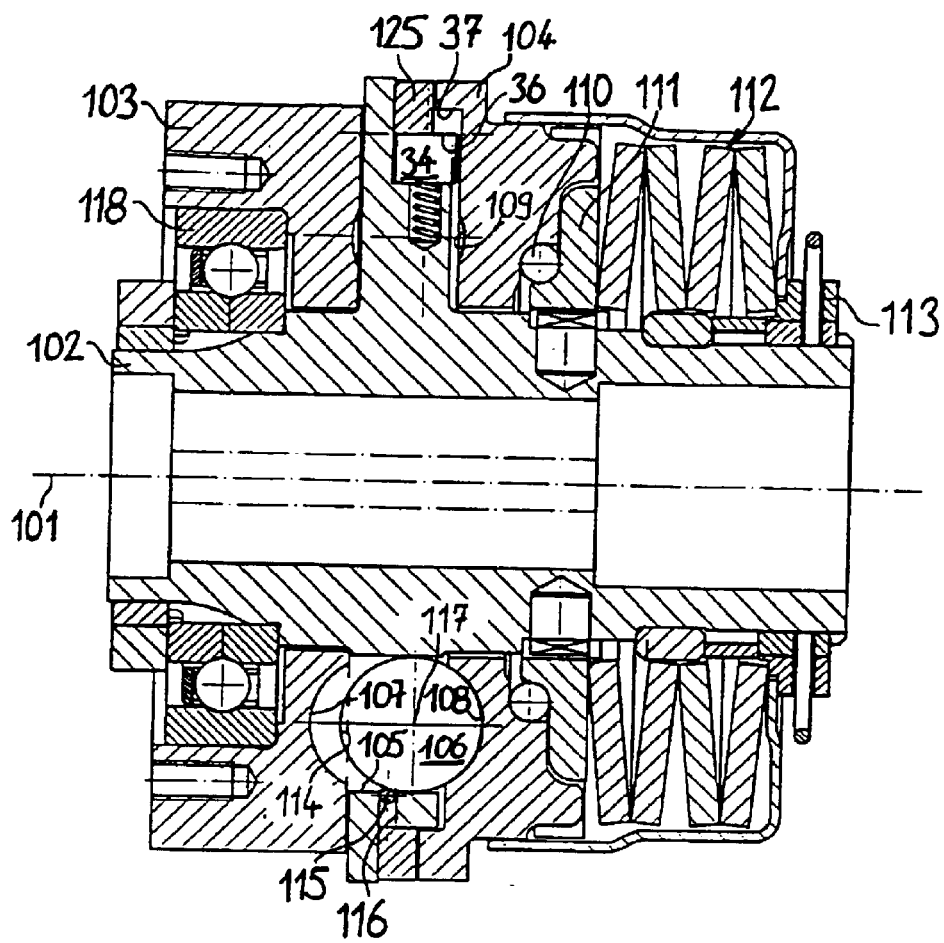
FIG. 5 is a cross-section view of a second embodiment of a torque limiting coupling.
Figure 6:
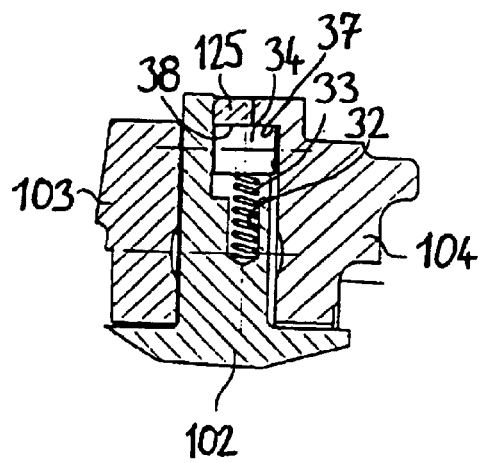
FIG. 6 is an enlarged section view cut-out of the locking mechanism and the retainer according to FIG. 5, with the locking mechanism in its locking position.
Figure 7:
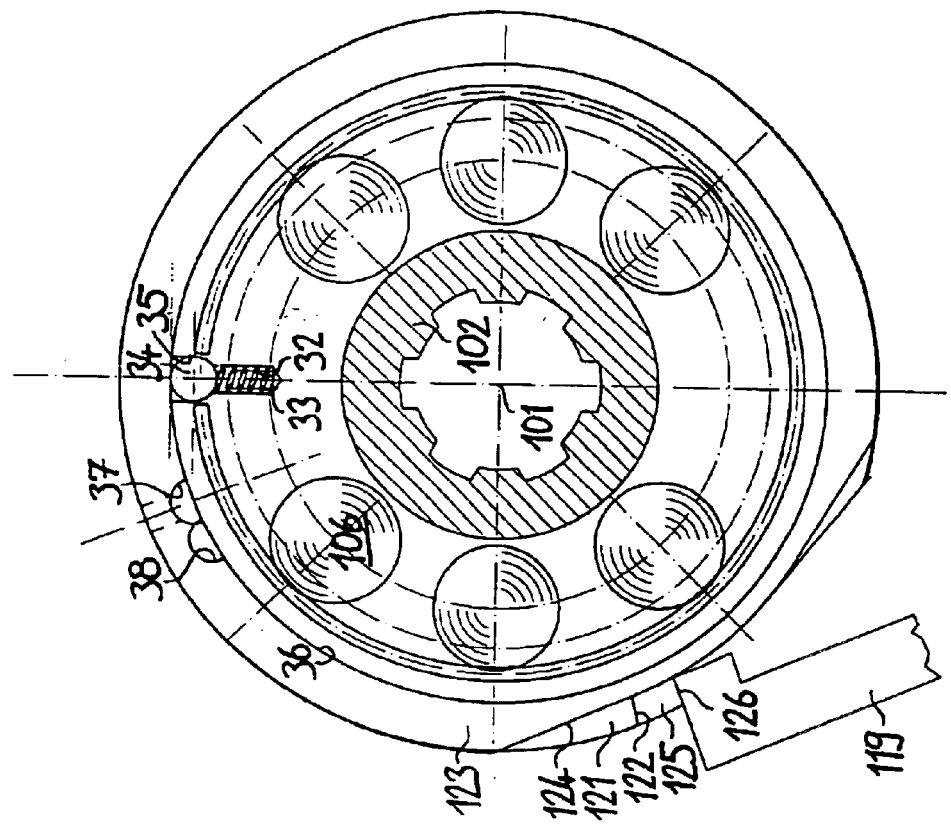
FIG. 7 is a diagrammatic cross-section view of the torque limiting coupling according to FIG. 5 with the switching disk in its coupling position.
Figure 8:
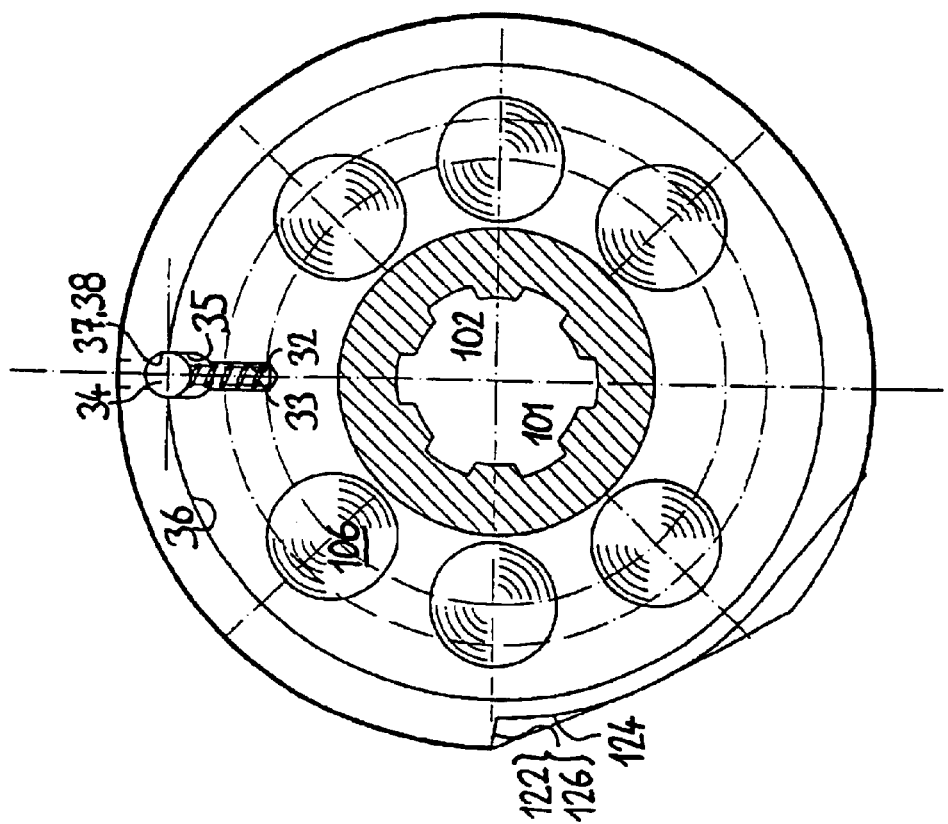
FIG. 8 is a diagrammatic cross-section view of the torque limiting coupling according to FIG. 5 with the switching disk in its uncoupling position.

FIG. 5 shows the switching disk in its uncoupling position and the retaining disk 125 in its retaining position. In this position, the locking member 34 is supported against the retaining disk 125 and does not engage the first second radial recess 37 of the switching disk 104. FIGS. 6 and 8 show the switching disk 104 in its uncoupling position and the locking disk 125 in its releasing position. The locking member 34 engages both the second radial recess 37 and the third radial recess 38. Thus, the locking member 34 holds the switching disk 104 relative to the coupling hub 102 in a rotationally fast way.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque limiting coupling, in particular in a driveline for driving agricultural implements, comprising:
    a longitudinal axis around which the torque limiting coupling is rotatably arranged;
    a coupling hub including circumferentially distributed apertures;
    driving members being held parallel relative to the longitudinal axis and being adjustable in the apertures of the coupling hub;
    a coupling sleeve driving the coupling hub and including first recesses corresponding to the apertures;
    a switching disk rotatably positioned relative to the coupling hub and being rotatable between a coupling position and an uncoupling position, said switching disk is loaded towards the coupling position by a spring force;
    an axially acting spring loads the switching disk towards the coupling hub, said switching disk being axially supported against the driving members, said driving members for torque transmitting purposes, engage the first recesses of the coupling sleeve;
    said switching disk, if a predetermined torque limit is exceeded, can be transferred from the coupling position into the uncoupling position by a rolling movement of the driving members;
    second recesses in said switching disk corresponding to the apertures and said second recesses being engaged by the driving members in the uncoupling position;
    locking mechanism being adjustable between a locking position where the switching disk, in its uncoupling position, is locked to prevent the switching disk from being rotated into the coupling position, and a disengaging position;
    a retainer being adjustable between a retaining position where the locking mechanism is secured in its disengaging position against being displaced into the locking position, and a releasing position;
    a detent pawl displaceable between a neutral position and a disconnecting position, said detent pawl, in the disconnecting position, cooperates with a radially extending switching face of the switching disk and transfers said switching disk from the coupling position into the uncoupling position, and
    said detent pawl, in the disconnecting position, cooperates with a radially extending switching face of the retaining means and transfers the retainer from the releasing position into the retaining position.

2. A torque limiting coupling according to claim 1, wherein the locking mechanism comprises at least one locking member which is adjustably parallel to the longitudinal axis and, in the locking position, holds the switching disk and the coupling hub in a rotationally fast way relative to one another.

3. A torque limiting coupling according to claim 2, wherein the locking mechanism is a spring-loaded pin adjustably guided in a bore of the coupling hub, said bore extending parallel to the longitudinal axis, and in the locking position, said pin enters a bore in the switching disk.

4. A torque limiting coupling according to claim 3, wherein the retainer being a retaining disk rotatably adjustable relative to the switching disk around the longitudinal axis, an aperture in said retaining disk which, in the releasing position, said aperture being aligned with the bore of the switching disk and enabling passage of the pin, and in the retaining position, said retaining disk covers the bore of the switching disk and prevents the pin from entering the bore.

5. A torque limiting coupling according to claim 1, wherein the locking mechanism comprises at least one locking member which is radially adjustable relative to the longitudinal axis and, in the locking position, holds the switching disk and the coupling hub in a rotationally fast way relative to one another.

6. A torque limiting coupling according to claim 5, wherein the locking member being a spring-loaded roller, said spring-loaded roller being adjustably guided in a first radial recess in an outer circumferential face of the coupling hub and, in the locking position, said spring-loaded roller enters a second radial recess in an inner circumferential face of the switching disk.

7. A torque limiting coupling according to claim 6, wherein the retainer being an annular retaining disk, said annular retaining disk is rotatably adjustable relative to the switching disk around the longitudinal axis, said annular retaining disk having a third radial recess starting from an inner circumferential face, wherein, in the releasing position, the third radial recess and the second radial recess of the switching disk are in alignment and said roller is being permitted to enter both the second radial recess and the third radial recess, and wherein, in the retaining position, the second radial recess and the third radial recess are offset relative to one another and said roller being prevented from entering the second radial recess.

* * * * *